United States Patent

[11] 3,629,903

| [72] | Inventor | Nadine Turner |
| | | 101 W. Main St., Warrenton, Mo. 63383 |
| [21] | Appl. No. | 848,543 |
| [22] | Filed | Aug. 8, 1969 |
| [45] | Patented | Dec. 28, 1971 |

[54] DEVICE FOR AND METHOD OF PREPARING FOWL WINGS
1 Claim, 8 Drawing Figs.
[52] U.S. Cl. ........................................... 17/11, 17/1 G
[51] Int. Cl. ............................................ A22c 17/04
[50] Field of Search ............................ 17/1 G, 11, 46

[56] References Cited
UNITED STATES PATENTS

| 3,192,557 | 7/1965 | Segur | 17/1 G |
| 3,412,425 | 11/1968 | Strum | 17/46 |
| 3,470,581 | 10/1969 | Hopkins | 17/11 |
| 3,510,908 | 5/1970 | Segur et al. | 17/11 |

*Primary Examiner*—Lucie H. Laudenslager
*Attorney*—Cohn and Powell

ABSTRACT: The device includes a support plate having an aperture which is compatibly configurated with the bone material of a fowl wing. By inserting the bone material of a severed wing portion into the aperture and urging the wing meat into engagement with the support plate, the meat at that end of the wing portion is pushed to the other end. Excess gristle may be removed from the bone by applying pressure to the bone material as it passes through the aperture.

PATENTED DEC 28 1971
3,629,903
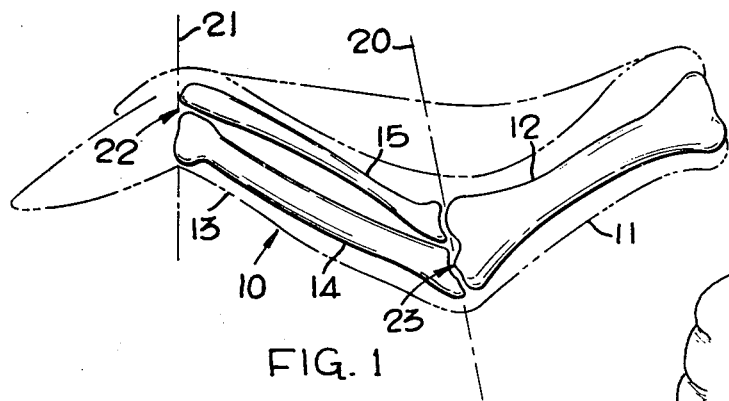
FIG. 1
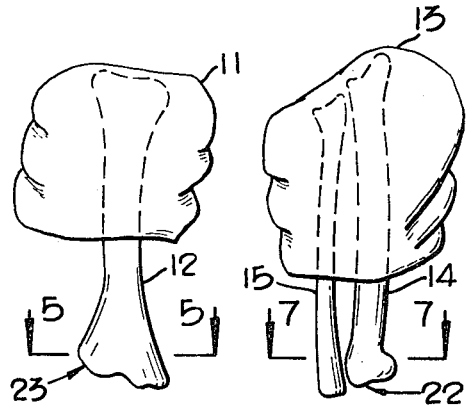
FIG. 4    FIG. 6
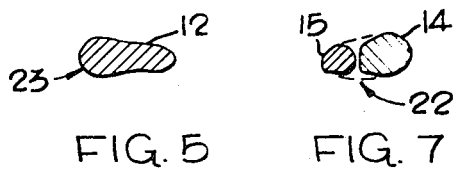
FIG. 5    FIG. 7
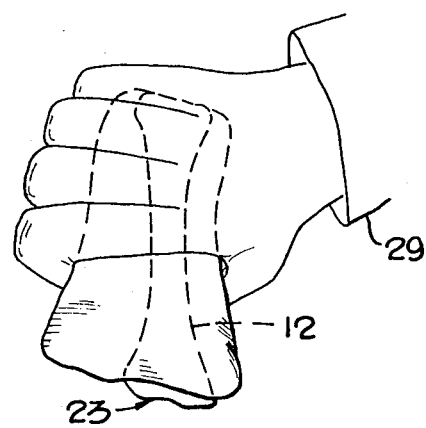
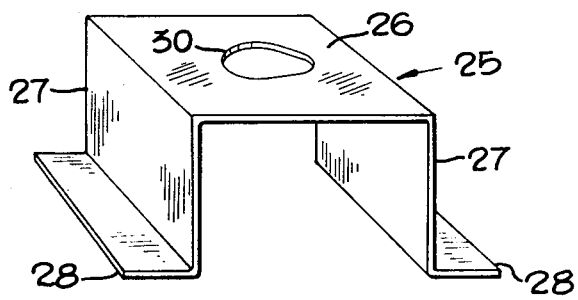
FIG. 2
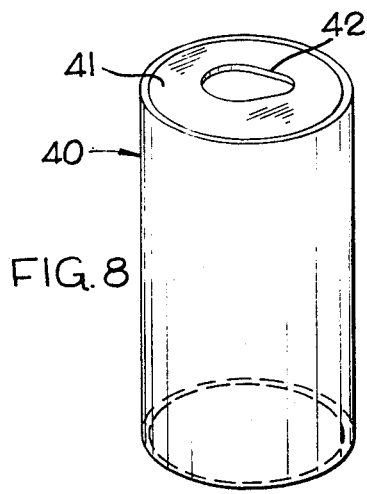
FIG. 8
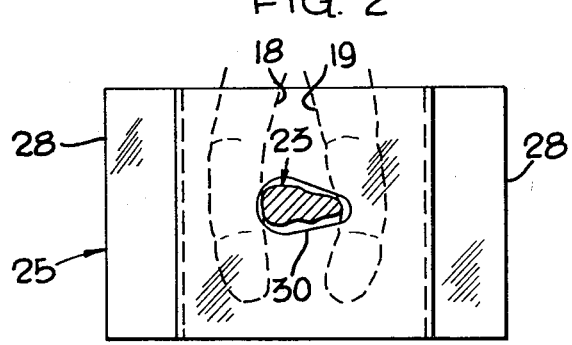
FIG. 3
Inventor
NADINE TURNER
By Cohn and Powell
Attorneys

DEVICE FOR AND METHOD OF PREPARING FOWL WINGS

BACKGROUND OF THE INVENTION

This invention relates in general to the processing of a fowl wing, and in particular to a method and device by which a chicken wing is converted into a pair of simulated drumsticks.

Although the wing portions of a fowl contain meat which is the equal of that on any part of the fowl, wing portions are not as popular as leg portions when prepared in the conventional manner. The reason for the greater popularity of the leg portions is due to the fact that the legs, or drumsticks as they are known, are more easily handled. Further on a drumstick, the meat is disposed about the leg bone in greater concentration and is therefore more easily accessible.

Attempts have been made to make wing portions more palatable. For example, one method has been to debone the outer wing portion and fold back the meat over the inner wing portion. This method tends to concentrate the meat but does not improve the handling characteristics. Another method, which probably originated in the Orient and which has been used extensively in Oriental restaurants for several years, provides for the creation of a simulated drumstick from a wing portion. The transference of meat is effectuated entirely by hand in this method and it is, for this reason, unsuitable for mass production because releasing joint gristle completely manually is both tedious and time consuming.

SUMMARY OF THE INVENTION

The processing of a chicken wing by the use of this device and method provides a pair of simulated drumsticks which are as succulent as chicken wings and ideally suited for hors d'oeuvres or regular meals. The meat is concentrated at one end and the bone is exposed to render the product as easy to handle as a conventional drumstick. The use of mechanical rather than manual means to release the joint gristle and to effectuate the transference of meat to one end of the bone material provides a process eminently suitable for mass production.

The device includes a support means having an aperture with a configuration compatible with that of the bone material of a fowl wing portion so that the meat on the bone material is pushed away from the end of the bone as it is inserted into and urged through the aperture. The aperture is slot shaped and is smaller at one end than the other end.

The support means includes a plate portion having a near face and a remote face. By gripping the bone material as it emerges from the aperture at the remote face of the support, excess gristle material is removed therefrom as the bone is urged through the aperture.

Spacer means carries the plate portion to facilitate the passage of bone material through the aperture and to expose sufficient bone material to provide a handle. The spacer means includes discontinuous wall means providing digital access to the remote face.

The method of preparing the defeathered fowl wing to produce a simulated drumstick comprises the steps of severing the upper and lower wing portions from each other, aligning the bone material of one of the wing portions with a compatibly configurated transverse aperture, inserting the bone material into the aperture and urging the wing portions towards the aperture portion to release the joint gristle and push the meat away from the bone material by engagement of the meat with the support means about the aperture margin. Applying pressure to the bone material as it emerges from the aperture pushes excess joint gristle from the bone material and substantially cleans the bone material of any other residual material clinging to the bone material, and such pressure may be applied by digitally overlapping the aperture at the remote side thereof so that the length of the bone is under digital pressure controlled by the operator.

BRIEF DESCRIPTION OF THE DRAWING

FIG. 1 is a plan view of a fowl wing;

FIG. 2 is a perspective view of the device in relation to a wing portion immediately prior to usage;

FIG. 3 is a plan view of the support plate illustrating the preferred configuration of the aperture;

FIG. 4 illustrates a simulated drumstick prepared from the upper wing portion;

FIG. 5 is a cross-sectional view of the upper wing taken on line 5—5 of FIG. 4;

FIG. 6 illustrates a simulated drumstick prepared from the lower wing portion;

FIG. 7 is a cross-sectional view of the lower wing taken on line 7—7 of FIG. 6, and FIG. 8 is a perspective view of a second embodiment of the device.

DESCRIPTION OF THE PREFERRED EMBODIMENTS AND METHOD

Referring now to the drawing and first to FIG. 1, it will be understood that the fowl wing which is to be prepared, is usually a chicken wing 10. The wing 10 includes an upper member 11, having meat disposed about and supported by a humerus bone 12, a lower member 13, having meat disposed about and supported by the radius and ulna bones 14 and 15 respectively and a wing tip 16 having various smaller bones such as the carpals, etc. Lines 20 and 21 delineate the portions of the wing as discussed above, but for convenience, the wing tip 16 will be considered as part of the lower member 13.

In order to practise the method of producing simulated drumsticks from the upper wing portion 11 and the lower wing portion 13, the wing tip 16 is cut away from the lower member 13 as by shears or a sharp knife, by cutting through the joint gristle around the joint adjacent the end 22 substantially along the line 21. The tip 16 is usually discarded. The upper portion 11 and the lower portion 13 are likewise separated from each other by cutting substantially along line 20 through the gristle material adjacent the joint end 23. Two edible portions are thus produced, each of which may be converted into a simulated drumstick by the use of the device illustrated in FIG. 2 which will now be described.

In its preferred embodiment the device, generally shown by numeral 25, includes a U-shaped member having an upper plate 26, sideplates 27 and outstanding feet 28. The device 25 constitutes a support and the upper plate 26 thereof includes an aperture 30. The feet 28 enable the device to be placed on a work table (not shown) or other surface. As shown in FIG. 3, the aperture 30 is preferably slot shaped, the aperture 30 having a larger diameter at one end than at the other end. This configuration substantially matches the section of the humerus bone 12 shown in FIGS. 4 and 5 and is sufficiently large to permit the insertion of the end 23 of said bone therein. The lower wing portion 13, as indicated in FIGS. 6 and 7, includes a pair of bones 14 and 15, one of which is thicker than the other. The configuration of the aperture 30, as described, conveniently receives this combined bone structure, the outline of which is indicated by numeral 22 in FIG. 7. Thus, a single aperture 30 may be utilized for releasing the joint gristle and pushing back the meat on both the upper wing portion 11 and the lower wing portion 13.

When the upper and lower portions 11 and 13 are separated, the surrounding joint gristle tends to adhere to the disconnected ends of the joint. Most of this gristle is released when the meat is pushed back from the bone material after insertion in the aperture 30 because the aperture is large enough to accept the bone material but small enough to push back the gristle material in the joint. However, a certain amount of excess gristle may remain at the end of the joint and along the bone and it is desirable to push back this excess gristle away from the exposed bone material. FIG. 3 indicates a means by which this may be achieved by the use of the operator's finger.

As noted above, the aperture 30 has a configuration sufficiently large and of a compatible shape to receive end 22 or end 23 of the bone material of wing portions 11 and 13 respectively. It will be understood that chicken bones are relatively soft and if the ends 22 or 23 of particular chicken bones are slightly larger than the aperture 30, it will yield or crush sufficiently to pass the relatively hard material of the device 25, normally metal or plastic. FIG. 3 illustrates the end 23 of humerus bone 12 in relation to the aperture 30 after insertion of the bone 12. The operator's index finger 18 and middle finger 19 are illustrated overlapping the aperture 30 and flanking the bone 12. By urging these fingers 18 and 19 toward each other, sufficient pressure is exerted on the bone 12 to push back excess gristle as the bone material is exposed. A similar result may be attained by providing a support plate 26 of yieldable resilient material resulting in a substantially resilient aperture rim.

It is thought that the structural features and functional advantages of this device and method have become fully apparent from the foregoing description of parts, but for completeness of disclosure, the operation will be briefly summarized. After upper and lower wing portions 11 and 13 have been separated by cutting through the skin and the gristle holding the joints together, the operator 29 grasps the chicken portion, for example the upper portion 11 as illustrated in FIG. 2, and aligns the bone 12 with the aperture 30. The end 23 of the bone is inserted into the aperture 30 and downward pressure is exerted by the operator 29. This downward pressure releases the joint gristle and urges the meat upwardly and when the wing portion is withdrawn from the aperture, a considerable portion of the humerus bone 12 is exposed.

It will be observed that, with respect to the lower wing 13, the initial insertion of the bone material at end 22 is preferred for the reason that the bone configuration at the elbow appears to be better suited for retaining the meat. However, if it is desired, for example, to utilize the tip material, the elbow end could be exposed and the meat pushed toward the tip 16.

In the preferred embodiment a resilient inner margin or partial margin is provided, for example, by the fingers 18 and 19 of the operator 29, which yields to permit passage of the bone yet exerts a pressure along the length of the bone which tends to urge excess joint gristle along the bone in an upwardly direction and in the process, thereby substantially cleaning the bone 12.

FIG. 8 represents another embodiment of the device. In this case, the device 40 is provided by a tube having an end cap 41 which corresponds to the upper plate 26 in the first embodiment. The aperture 43 has preferably substantially the same configuration as the aperture 30, namely slot shaped, having a larger diameter at one end than at the other. The device 40 illustrated in FIG. 8 may be grasped in one hand of the operator while the other hand grasps the chicken wing portion. The operation is thereafter essentially as described above.

I claim as my invention:

1. A device for preparing a simulated drumstick from a defeathered fowl wing which includes elongate bone material having meat thereon and an exposed end, the device comprising:
   a. support means including an aperture having a continuous margin, the aperture being adapted to have a compatible configuration with the bone material and of a size to receive the end of the bone material therethrough whereby the support means pushes meat from the bone material along the length of said bone material upon insertion of the bone material into the aperture,
   b. the support means including a plate portion housing the aperture, and
   c. surface engageable spacer means including opposed sideplate portions extending transversely of the plate portion carrying the plate portion to facilitate passage of the bone material beyond the plate portion whereby to expose sufficient bone material to provide a handle.

* * * * *